United States Patent
Moratz

(10) Patent No.: US 9,556,911 B2
(45) Date of Patent: Jan. 31, 2017

(54) BEARING SEAL FOR MEDIA LUBRICATION

(71) Applicant: Schaeffler Technologies AG & Co. KG, Herzongenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/799,155

(22) Filed: Jul. 14, 2015

(65) Prior Publication Data

US 2016/0040719 A1    Feb. 11, 2016

Related U.S. Application Data

(60) Provisional application No. 62/033,833, filed on Aug. 6, 2014.

(51) Int. Cl.
   *F16C 33/66* (2006.01)
   *F16C 33/78* (2006.01)
   *F16C 19/06* (2006.01)

(52) U.S. Cl.
   CPC ............ *F16C 33/667* (2013.01); *F16C 33/78* (2013.01); *F16C 33/784* (2013.01); *B01D 2201/342* (2013.01); *F16C 19/06* (2013.01)

(58) Field of Classification Search
   CPC ......... F16C 19/06; F16C 33/78; F16C 33/726; F16C 33/784; F16C 33/7889; F16F 33/667; Y10S 277/918; Y10S 277/946; B01D 2201/342
   USPC ....... 384/462, 470, 473, 477, 481, 510, 607; 277/345, 376, 397, 918, 342
   See application file for complete search history.

(56) References Cited

U.S. PATENT DOCUMENTS

| | | | | |
|---|---|---|---|---|
| 4,846,592 | A * | 7/1989 | Tsumori | F16C 33/667 277/402 |
| 5,492,416 | A | 2/1996 | Gabelli et al. | |
| 5,513,918 | A | 5/1996 | Wan | |
| 6,616,336 | B1 * | 9/2003 | Sayles | F16C 33/38 384/300 |
| 7,950,856 | B2 * | 5/2011 | Sada | F16C 19/364 384/473 |
| 8,262,290 | B2 * | 9/2012 | Feldmeier | F16C 33/6648 384/469 |

(Continued)

FOREIGN PATENT DOCUMENTS

| | | | | |
|---|---|---|---|---|
| DE | | 4329398 A1 * | 7/1994 | .......... F16C 33/6674 |
| DE | | 19637689 A1 * | 3/1998 | .............. F16C 33/66 |

(Continued)

OTHER PUBLICATIONS

Web site: http://www.tomoegawa.co.jp/english_2/product/p_ssm/ssm1506.html.

*Primary Examiner* — Marcus Charles
(74) *Attorney, Agent, or Firm* — Volpe amd Koenig, P.C.

(57) ABSTRACT

A rolling bearing assembly including a radially inner ring defining an inner race, a radially outer ring defining an outer race, and rolling elements supported between the inner ring and the outer ring is provided. At least one filter seal is arranged between the radially inner ring and the radially outer ring. The at least one filter seal includes a first washer having a first plurality of openings, a second washer having a second plurality of openings, and a filter washer arranged axially between the first and second washers, and the first washer, second washer, and filter washer are laminated together.

10 Claims, 2 Drawing Sheets

(56) References Cited

U.S. PATENT DOCUMENTS

2008/0006357 A1\* 1/2008 Wakabayashi ........ F16C 19/184
   152/415
2010/0316317 A1   12/2010 Feldmeier
2016/0108962 A1\* 4/2016 Miyazaki .............. F16C 33/667
   384/473

FOREIGN PATENT DOCUMENTS

| DE | WO 2007073806 A1 | \* | 7/2007 | ........... B01D 29/111 |
|----|------------------|---|--------|-------------------------|
| EP | 600559 A1 | \* | 4/1994 | .............. F16C 23/08 |
| JP | 3218690 A | | 9/1991 | |
| JP | 4-187423 | \* | 7/1992 | .............. F16C 33/78 |
| JP | 2537273 | | 3/1997 | |
| JP | 2838416 B2 | | 12/1998 | |
| JP | 3088042 B2 | | 9/2000 | |
| JP | 2006207613 A | \* | 8/2006 | .............. F16C 33/78 |

\* cited by examiner

BEARING SEAL FOR MEDIA LUBRICATION

INCORPORATION BY REFERENCE

The following document is incorporated herein by reference as if fully set forth: U.S. Provisional Patent Application No. 62/033,833 filed Aug. 6, 2014.

FIELD OF INVENTION

The present invention relates to a rolling bearing assembly for use in surrounding media, and more particularly to a seal for use in such a rolling bearing assembly.

BACKGROUND

Bearing assemblies are used in a wide range of applications, including some applications that require the bearing assembly to be submerged in media. In these known submerged bearing assemblies, the media can as a lubricant; however, solid contaminants from the surrounding media can infiltrate the bearing assembly. These solid contaminates damage the races of the bearing assembly. The damage caused by these solid contaminants reduces the efficiency of the bearing by increasing the friction coefficient of the contact surfaces, reducing bearing life and causing premature failure. Known solutions to preventing the ingress of solid contaminants to a bearing assembly include providing a seal. However, known seals for submerged bearing assemblies completely prevent any media from traveling through the assembly, including lubrication which is necessary to ensure reliable operation of the bearing assembly.

SUMMARY

A rolling bearing assembly including a seal that allows the ingress and egress of media for lubrication but prevents the ingress of contaminant particles in the media is provided. The rolling bearing assembly includes a radially inner ring defining an inner race, a radially outer ring defining an outer race, and rolling elements supported between the radially inner ring and the radially outer ring. The rolling elements run on the inner race and the outer race. The rolling bearing assembly includes at least one filter seal arranged between the radially inner ring and the radially outer ring. The at least one filter seal includes a first washer having a first plurality of openings, a second washer having a second plurality of openings, and a filter washer arranged axially between the first and second washers, and the first washer, second washer, and filter washer are laminated together.

A method of preventing contaminants in media from entering a rolling bearing assembly is also provided. The method comprises providing a rolling bearing assembly including a radially inner ring defining an inner race, and a radially outer ring defining an outer race. Rolling elements are supported between the radially inner ring and the radially outer ring, and the rolling elements run on the inner race and the outer race. The method includes providing at least one filter seal arranged between the radially inner ring and the radially outer ring. The at least one filter seal includes a first washer having a first plurality of openings, a second washer having a second plurality of openings, and a filter washer arranged axially between the first washer and the second washer. The first washer, second washer, and filter washer are laminated together. The method includes placing the rolling bearing assembly in operation in the media, and excluding contaminants in the media from entering the races of the rolling bearing assembly via the at least one filter seal.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
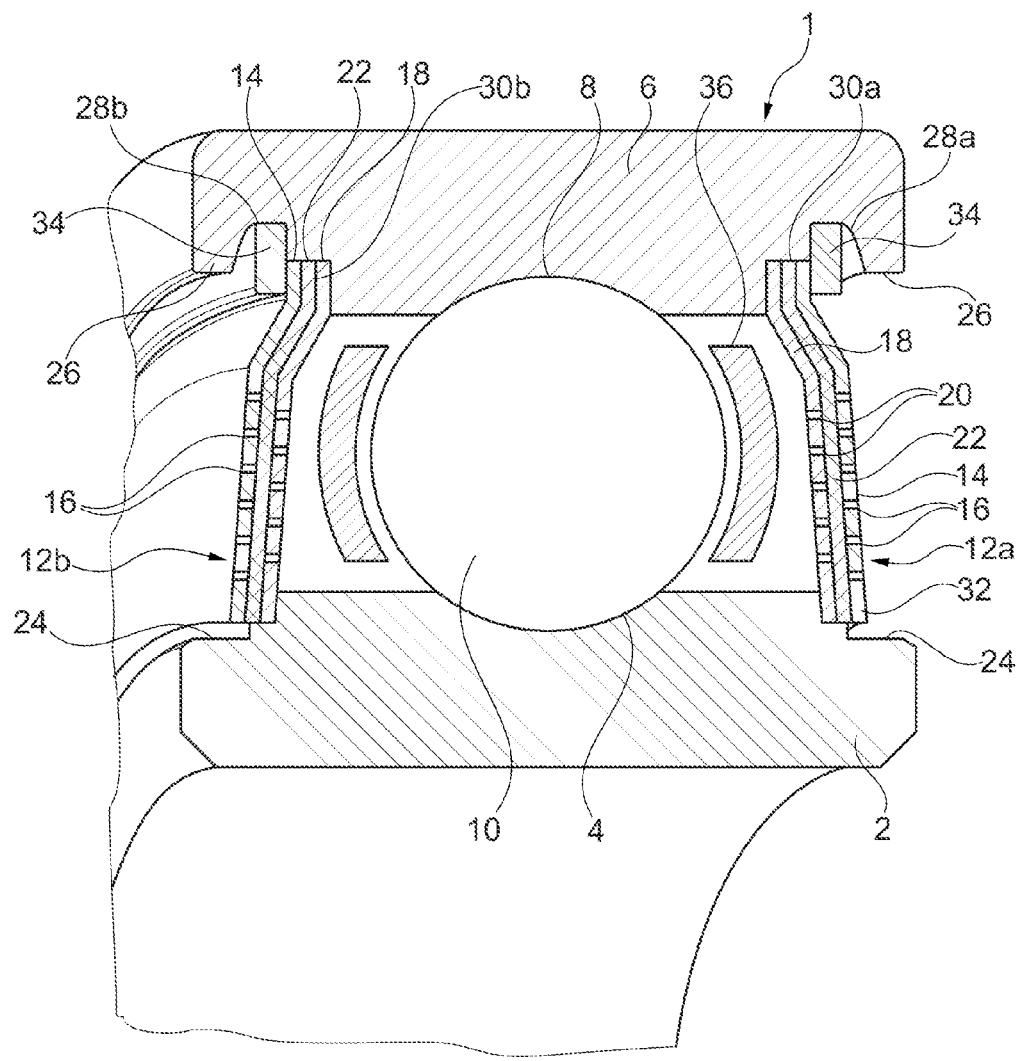
FIG. 1 shows a cross sectional view of a rolling bearing assembly including two filter seals.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIG. 1, a rolling bearing assembly 1 is provided. The rolling bearing assembly 1 includes a radially inner ring 2 defining an inner race 4, and a radially outer ring 6 defining an outer race 8. Rolling elements 10 are supported between the radially inner ring 2 and the radially outer ring 6, and the rolling elements 10 run on the inner race 4 and the outer race 8. Although spherical ball bearings are shown in FIG. 1, one of ordinary skill in the art recognizes any known type of rolling elements could be used, including tapered or cylindrical rollers, or combinations of various rolling elements. The radially inner ring 2 includes first annular notches 24 arranged on either axial side of the inner race 4. The radially outer ring 6 includes second annular notches 26 on either axial side of the outer race 8. The second notches 26 each include a groove 28a, 28b, which preferably extends radially into the outer ring 6.

At least one filter seal 12a, 12b is arranged between the radially inner ring 2 and the radially outer ring 6. The at least one filter seal 12a, 12b includes a first washer 14 having a first plurality of openings 16, a second washer 18 having a second plurality of openings 20, and a filter washer 22 arranged axially between the first washer 14 and the second washer 18. The filter washer 22 is preferably a mesh having openings or a microporous membrane having openings with a size in the range of 10 to 50 microns, and can be made from a polymeric material, such as a polytetrafluoroethylene (PTFE) fiber. One such polytetrafluoroethylene (PTFE) fiber that can be used to form the filter washer 22 is Tomifleck F, which is produced by Tomoegawa Co., Ltd., Tokyo, Japan. In one embodiment, the filter washer 22 has a thickness between 50 to 1,000 microns. In one embodiment, the filter washer 22 has a density between 60 to 800 g/m$^2$. One of ordinary skill in the art recognizes that the diameter, thickness, pore size, composition, and other characteristics of the filter washer 22 can be varied in order to control pressure loss and other features of the filter washer 22. The filter washer 22 can be formed from glass fibers, carbon fibers, or other types of fibers and combinations thereof suitable for filtering contaminants and other particles.

The first and second pluralities of openings 16, 20 are preferably equally distributed circumferentially around the first washer 14 and second washer 18, respectively. The first washer 14, second washer 18, and filter washer 22 are laminated together. In a preferred embodiment shown in FIG. 1, two filter seals 12a, 12b are provided, and each of the filter seals 12a, 12b includes a radially outer end 30 fixedly engaged within a respective one of the grooves 28a, 28b on the radially outer ring 6, and a radially inner end 32 that contacts the radially inner ring 2. The radially outer ends 30a, 30b of the filter seals 12a, 12b are each secured within a respective one of the grooves 28a, 28b of the radially outer ring 6 by a snap wire 34 or a snap ring. In one preferred embodiment, a cage 36 is provided for the rolling elements 10.

In one preferred embodiment, the filter washer 22 is between 12-20 mm thick. In a more preferred embodiment, the filter washer 22 is 16 mm thick. The first washer 14 and second washer 18 are preferably the same size. In one preferred embodiment, the first washer 14 and the second washer 18 are both 0.010 inches thick. In a more preferred embodiment, the first washer 14 and second washer 18 are 0.006-0.008 inches thick. In one preferred embodiment, the first washer 14 and the second washer 18 are stainless steel. In one preferred embodiment, the first washer 14 is arranged facing the inner and outer races 4, 8, and the first washer 14 is formed of a PTFE fiber. In a preferred embodiment, the first washer 14 is formed from a non-binding porous thin sheet.

Figure 2:
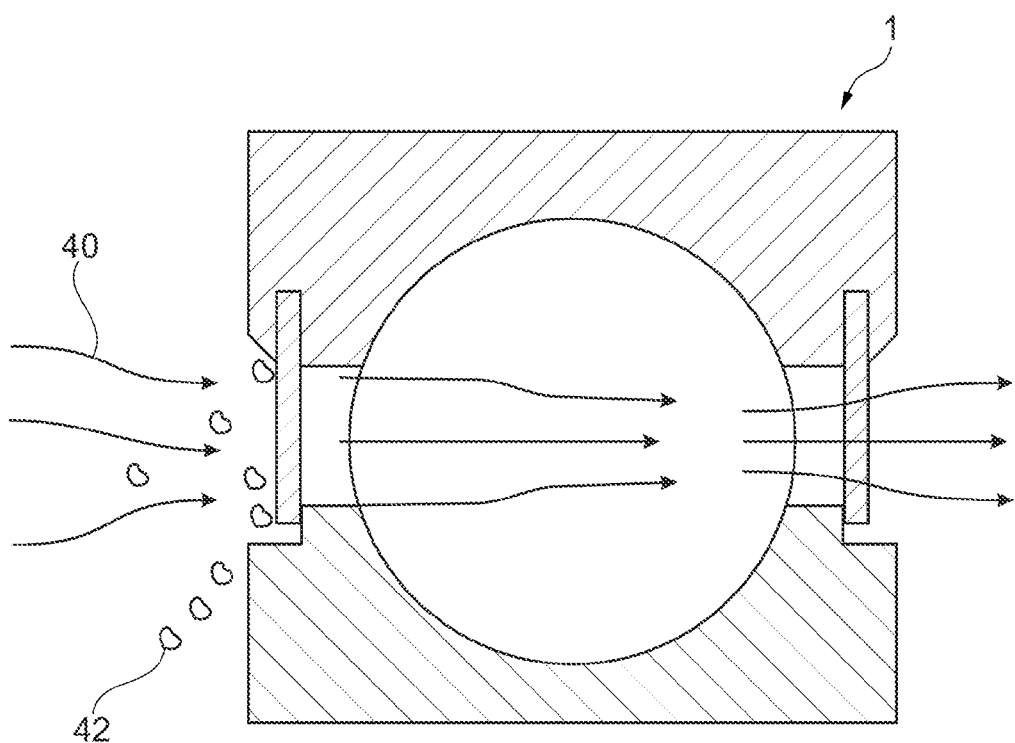
FIG. 2 shows the rolling bearing assembly in media, including contaminants.

A method of preventing contaminants from media from entering a rolling bearing assembly 1 is also provided. The method comprises providing a rolling bearing assembly 1 including a radially inner ring 2 defining an inner race 4, and a radially outer ring 6 defining an outer race 8. Rolling elements 10 are supported between the radially inner ring 2 and the radially outer ring 6, and the rolling elements 10 running on the inner race 4 and the outer race 8. The method includes providing at least one filter seal 12 arranged between the radially inner ring 2 and the radially outer ring 6. The at least one filter seal 12 includes a first washer 14 having a first plurality of openings 16, a second washer 18 having a second plurality of openings 20, and a filter washer 22 arranged axially between the first washer 14 and the second washer 18. The first washer 14, second washer 18, and filter washer 22 are laminated together. The method includes placing the rolling bearing assembly 1 in operation in the media, and excluding contaminants in the media from entering the races 4, 8 of the rolling bearing assembly 1 via the at least one filter seal 12. FIG. 2 shows the flow of media 40 through the rolling bearing assembly 1. As shown in FIG. 2, the contaminants 42 are prevented from entering the rolling bearing assembly 1, but the media 40 can flow through the two filter seals to provide lubrication.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of the claims are therefore to be embraced therein.

What is claimed is:

1. A rolling bearing assembly comprising:
a radially inner ring defining an inner race;
a radially outer ring defining an outer race;
rolling elements supported between the radially inner ring and the radially outer ring, the rolling elements running on the inner race and the outer race; and
at least one filter seal arranged between the radially inner ring and the radially outer ring, the at least one filter seal including a first washer having a first plurality of openings, a second washer having a second plurality of openings, and a filter washer arranged axially between the first washer and the second washer, and the first washer, the second washer, and the filter washer are laminated together.

2. The rolling bearing assembly of claim 1, wherein the radially inner ring includes first notches arranged on either axial side of the inner race, the radially outer ring includes second notches on either axial side of the outer race, and the second notches each include a groove.

3. The rolling bearing assembly of claim 2, wherein the at least one filter seal comprises two of the filter seals, and each of the filter seals includes a radially outer end fixedly engaged within a respective one of the grooves on the radially outer ring, and a radially inner end that contacts the radially inner ring.

4. The rolling bearing assembly of claim 3, wherein the radially outer ends of the filter seals are each secured within a respective one of the grooves of the radially outer ring by a snap wire or a snap ring.

5. The rolling bearing assembly of claim 1, wherein the first washer and the second washer are stainless steel.

6. The rolling bearing assembly of claim 1, further comprising a cage for the rolling elements.

7. The rolling bearing assembly of claim 1, wherein the filter washer is between 12-20 mm thick.

8. The rolling bearing assembly of claim 1, wherein the filter washer is 16 mm thick.

9. The rolling bearing assembly of claim 1, wherein the first washer is arranged facing the inner race and the outer race, and the first washer is formed of polytetrafluoroethylene (PTFE) fiber.

10. A method of preventing contaminants from media from entering a rolling bearing assembly, the method comprising:
providing a rolling bearing assembly including a radially inner ring defining an inner race, a radially outer ring defining an outer race, and rolling elements supported between the inner ring and the outer ring, the rolling elements running on the inner race and the outer race,
providing at least one filter seal arranged between the inner ring and the outer ring, the at least one filter seal including a first washer having a first plurality of openings, a second washer having a second plurality of openings, and a filter washer arranged axially between the first washer and the second washer, and the first washer, the second washer, and the filter washer are laminated together;
placing the rolling bearing assembly in operation in the media; and excluding contaminants in the media from entering the races of the rolling bearing assembly via the at least one filter seal.

* * * * *